United States Patent [19]

Ruddick

[11] 3,776,260
[45] Dec. 4, 1973

[54] BEER KEGS AND LIKE CONTAINERS

[75] Inventor: Maurice Ruddick, Sevenoaks, England

[73] Assignee: Burnett & Rolfe Limited, Kent, England

[22] Filed: Apr. 7, 1972

[21] Appl. No.: 242,052

[30] Foreign Application Priority Data
Dec. 17, 1971 Great Britain.................58761/71
April 13, 1971 Great Britain..................9243/71

[52] U.S. Cl.................. 137/321, 137/212, 251/318, 251/354, 222/400.7
[51] Int. Cl............................................ F16k 31/58
[58] Field of Search.................... 137/212, 320, 321, 137/322; 251/318, 324, 336, 341, 347, 349, 354; 222/400.7

[56] References Cited
UNITED STATES PATENTS

| | | | |
|---|---|---|---|
| 2,638,914 | 5/1953 | Flaith et al...................... | 137/321 X |
| 3,348,565 | 10/1967 | Turner.................................. | 137/212 |
| 3,353,724 | 11/1967 | Johnston........................... | 137/212 X |
| 3,412,747 | 11/1968 | Sichler............................... | 137/212 |
| 3,473,556 | 10/1969 | Johnson et al.................. | 137/212 X |
| 3,698,417 | 10/1972 | Smith et al.......................... | 137/212 |

*Primary Examiner*—Martin P. Schwadron
*Assistant Examiner*—David R. Matthews
*Attorney*—Joseph F. Brisebois et al.

[57] ABSTRACT

A spear and closure assembly which is arranged to be fitted as a single unit in the neck of a beer keg or like container comprises a tubular housing having one end open and the spear fixed to the housing and projecting from its other end, and a valve seat which is fixed to the housing so that it is located adjacent the open end of the housing and projects radially inwards with respect to the open end. The housing, the spear, and the valve seat are connected to form a unitary structure, such as by welding or by a combination of welding and being formed integrally. A spring located within the housing acts on a disc like closure member so that a resilient valve ring is pressed by the closure member against the valve seat, hence closing the opening bounded by the valve seat. Assembly of the spring, the closure member, and the valve ring within the structure is made easy by arranging that the size and shape of the spring and closure member allow these to be passed through the opening bounded by the valve seat, and by providing the valve ring with sufficient resilience to allow it to be deformed and squeezed through this opening. In use, application of a filling or dispensing fitting moves the valve ring and the closure member axially inwards against the action of the spring, the valve ring being displaced axially relative to the closure member and forming a seal against a second valve seat formed on the housing so that two separate passages are formed through the fitting and into the container, one through the housing and the spear and the other outside the housing via an aperture between the two valve seats.

13 Claims, 3 Drawing Figures

BEER KEGS AND LIKE CONTAINERS

This invention relates to beer kegs and similar containers for potable liquids of the kind which have a filling and dispensing opening fitted with a tube, which is commonly known as a spear, and a spring loaded closure valve. When the container is filled with liquid, or liquid is dispensed from it, a fitting is applied to the opening and this fitting engages with the valve and opens it. On opening the valve, two separate passages are opened between the container and the fitting. One passage leads to the spear and the other leads to the space within the container outside the spear. For filling the container when it is upright, the liquid is supplied through the spear and a gas back pressure is applied to the space outside the spear where it acts on the free surface of the liquid as it fills the container. To dispense liquid from the container, a gas top pressure is again applied to the space within the container surrounding the spear and this forces the liquid up through the spear and hence out of the container. If filling and dispensing is to be carried out with the container inverted, the gas and liquid connections are reversed.

The spear and closure valve combinations which have been used in such containers consist of a number of components which are screwed, clipped, or otherwise fitted together either as the combination is assembled in the container opening or to form a complete assembly which is subsequently fitted in a container opening. However, the arrangement of the components in these combinations has been such that manufacture and assembly have proved rather complex.

According to the present invention, a spear and closure valve assembly for fitting to a keg or like container comprises a tubular housing having one end open and the spear fixed to the housing and projecting from its other end, a valve seat which is fixed to the housing so that it is located adjacent the open end of the housing and projects radially inwards with respect to the inner periphery of the open end, a resilient valve ring which is pressed by a spring against the valve seat, and a closure member which closes the opening bounded by the valve ring when the ring is on the valve seat, the valve ring having sufficient resilience for it to be deformed and passed through the opening bounded by the valve seat, and the arrangement being such that when the assembly is fitted in a container, application of a filling or dispensing fitting moves the valve ring axially inwards off the valve seat, the ring becoming displaced axially relative to the closure member and sealing against a second seat to form two separate passages through the fitting and into the container, one through the housing and the spear and the other outside the housing via an aperture between the valve seat and the second seat.

The advantage of this arrangement is that the spear, the housing, and the valve seat can be fixed together to form a rigid construction before the moving parts of the valve are fitted in position. The parts are inserted into the rigid construction through the opening bounded by the valve seat, and after being arranged correctly the engagement of the valve ring with the valve seat prevents the parts from coming out again. This means that the putting together of the components of the assembly in accordance with the present invention is much simpler than with previous arrangements, and manufacturing costs are less also.

If various components of the assembly are screwed or clipped together it is almost inevitable that very small clearances or crevices will occur at the joints. There is then a danger that when containers fitted with such assemblies are washed and sterilized after use and before refilling, these joints and crevices may not be sterilized completely. In order to reduce this danger, preferably the housing and the spear are integral or are welded to each other so that they form a unitary structure with no crevices between them, and the valve seat is welded to or is formed integrally with the housing.

In one form of assembly in accordance with the invention, the spear extends through the housing to the open end of the housing and has its end at the open end of the housing closed, there being a port through its wall near the open end of the housing. The closed end of the spear then has a lip forming another seating surface on which the valve ring seats when it is on the valve seat and the valve is closed. The closed end of the spear thus forms the closure member. When the valve ring is pressed inwards by a filling or dispensing fitting, it slides along the spear and seats around the spear on the side of the port remote from the closed end of the spear. The surface of contact with the ring on the spear when the ring is in this inwardly pushed position, i.e., the open position of the valve, forms the second seat and one passage through the fitting then passes directly from the fitting and through the port into the bore of the spear, and the other passage extends through the aperture to the space within the container on the outside of the spear. With this form of valve, the ring is made so that it can be forced into the construction between the valve seat and the lip at the closed end of the spear and, on recovering its unstressed shape within the construction, is retained by the valve seat and the lip. Assembly of the valve is thus extremely simple since all that is necessary is to insert a coiled compression spring through the opening bounded by the valve seat into the housing surrounding the spear and then to force the valve ring through the same opening so that the spring then acts between the inner end of the housing and the valve ring to press the ring against the valve seat and the lip.

In another form of assembly, which is preferred, the spear does not extend into the housing and the closure member is movable axially within the housing and is acted upon by the spring to press the valve ring against the valve seat, application of the filling or dispensing fitting during use moving both the valve closure member and the valve ring axially inwards.

In more detail, when the fitting is applied, a central member of the fitting engages with the closure member and presses this inwards into the housing against the action of the spring. The valve ring is also carried inwards, but while the closure member is moved past the second seat, which is located on the housing, an annular flange on the fitting engages the valve ring and presses this against the second seat so that a seal is formed between the fitting and the housing at this point. The fitting has two separate ducts which open on opposite sides of the annular flange which engages the valve ring, and hence two separate passages are formed in communication with the interior of the container, one through the housing and the spear and the other through the aperture and outside the housing.

With this arrangement the valve can again be assembled in a very simple manner. Firstly the spring, which will usually be a coiled compression spring, is inserted through the valve seat opening and into the housing where it acts against a stop, for example, the end of the housing surrounding its connection to the spear. Then, with the spring compressed, the valve closure member, which is sized to allow it to pass through the valve seat opening, is inserted into the housing, and finally the valve ring is forced through the valve seat opening and allowed to resume its unstressed form adjacent the valve seat. The spring is then released and the closure member is pressed by the spring against the underside of the valve ring, and the valve ring is in turn pressed by the closure member against the valve seat.

In order to allow it to pass through the opening bounded by the valve seat the valve closure member may have a diameter which is slightly smaller than that of the opening. However, there is then a risk that in the event of the valve ring perishing the member may be forcibly ejected through the opening by the spring, possibly causing damage to other equipment or injury to attendant persons. With the aim of eliminating this risk while retaining the ease of assembly for the valve, preferably the closure member is shaped so that it will not pass through the opening bounded by the valve seat when substantially parallel to the plane of the opening but can be passed through when inclined to the plane in a particular manner. With this arrangement, since the spring holds the closure member parallel to and centred with respect to the valve seat opening, the member is too large to be ejected through the opening if the valve ring perishes.

The periphery of the valve closure member may be arranged in many different ways to achieve the desired function, but preferably the periphery is basically circular, the diameter being slightly greater than the diameter of the opening bounded by the valve seat, but has a flat which enables the member to be inserted through the opening. Preferably there are two flats on the periphery positioned diametrically opposite each other with a perpendicular distance between them which is slightly less than the diameter of the valve seat opening.

The valve ring is preferably in the form of an O-ring made of rubbery or plastics material, and the valve seat is arcuate in radial section so that the O-ring can seat upon it and is self-centering. The closure member may also be formed with a concave seating surface which is arcuate in radial section so that the valve ring seats snuggly between the member and the valve seat when the valve is closed.

The aperture may be located in the wall of the housing near its open end, in which case, in the preferred form of the assembly the second seat is located on the inside of the housing on the side of the aperture remote from the valve seat. Alternatively the aperture may comprise a space between the valve seat and the open end of the housing, the valve seat being formed on a radially inwardly projecting flange which is spaced axially from the open end of the housing and is carried by a sleeve surrounding the housing and fixed to its outside by a number of webs, the aperture communicating with the gaps between the webs. In this case, in the preferred form of the assembly the second seat may be located at the open end of the housing but is preferably on the inside of the housing. When the second seat is on the inside of the housing it is preferably formed by the internal surface of the housing adjacent its open end and a radially inwardly projecting shoulder formed integrally with the housing.

An example of a spear and closure valve assembly in accordance with the present invention will now be described with reference to the accompanying drawings, in which.

Figure 1:
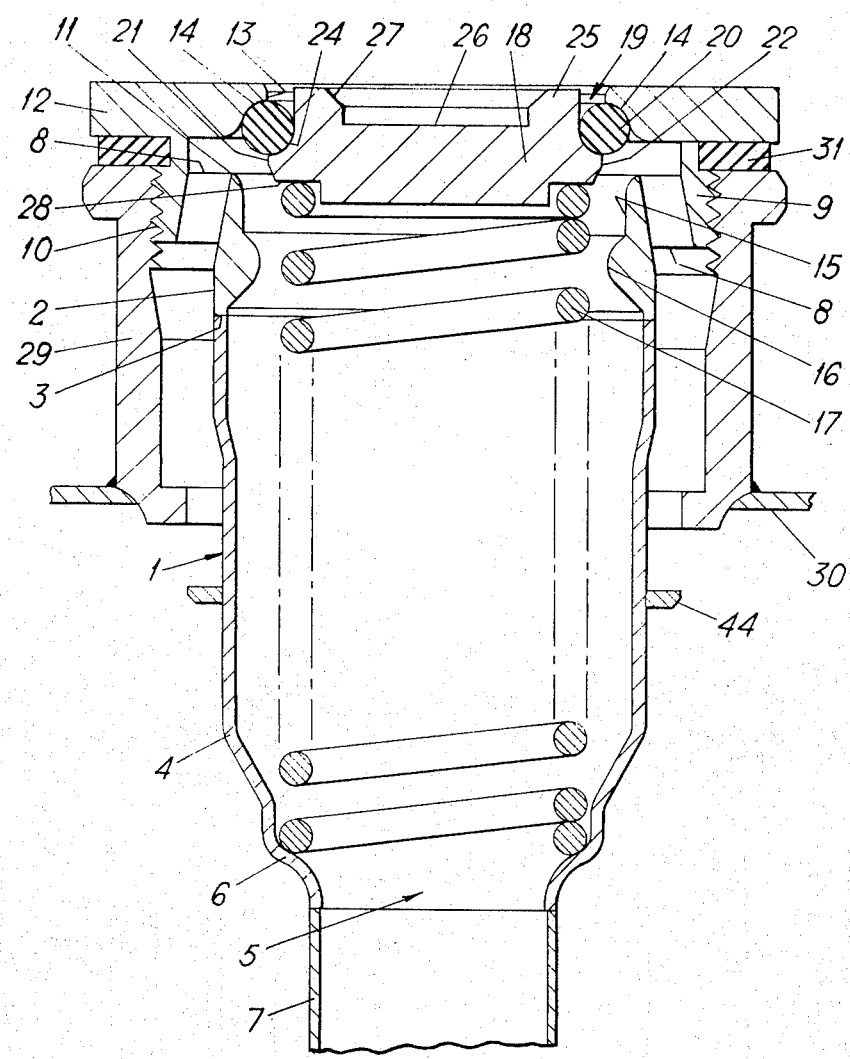
FIG. 1 is an axial section through the assembly when fitted in the neck of a beer keg and with the valve closed.

The assembly comprises a tubular stainless steel housing 1 formed from an annular upper part 2 which is butt welded at 3 onto the rim of a cup-shaped lower part 4. The lower part has an opening 5 in its lower end 6 and the upper end of a tubular stainless steel spear 7 is butt welded to the lower end 6 surrounding the opening 5.

Projecting radially from the outside of the upper part 2 of the housing are a number of evenly spaced webs 8 which support a sleeve 9 around the upper part 2. The sleeve 9 has an external screwthread 10 and projects upwards beyond the open upper end 11 of the housing 1 where it carries a horizontal annular flange 12. This flange extends both radially outwards and inwards of the sleeve 9 and the lower edge of the inner face 13 of the flange 12 is cut away to provide a valve seat 14 which is arcuate in profile and is spaced axially from the upper end 11. Near the upper end 11 the housing has an internal annular shoulder 16 which, together with the surface 15, forms a second valve seating surface. The shoulder 16 is formed integrally with the upper part 2 of the housing and indeed, the upper part 2 is formed integrally with the webs 8, the sleeve 9, and the flange 12, the parts being machined from a single stainless steel blank. Alternatively the shoulder 16 may be formed by a portion of the housing wall which is pressed radially inwards.

Within the housing 1 a coiled compression spring 17 acts between the lower end 6 of the cup-shaped lower housing part 3 and the under side of a valve closure member 18. The spring 17 urges the closure member 18 towards the opening 19 bounded by the inner face 13 and the valve seat 14, and a valve sealing ring 20 is clamped between the closure member 18 and the valve seat 14.

The valve ring 20 is a rubber O-ring having an outer diameter marginally greater than the diameter of the inner periphery 15 at the upper end 11 of the housing, and greater than the diameter of opening 19 about the diameter of the ring itself. The resilience of the ring 20 is however such that the ring can be deformed and squeezed through the opening 19.

Figure 3:
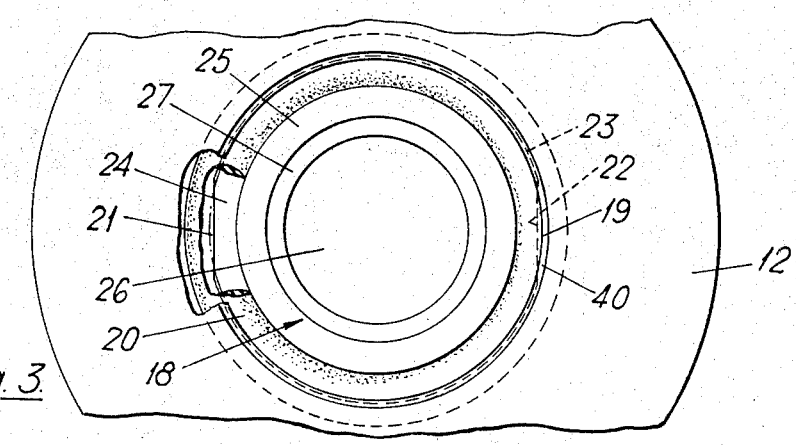

The valve closure member 18 is circular apart from a pair of diametrically opposite flats 21 and 22 on the outermost periphery 23 of the member. As shown in FIG. 3 the diameter of the periphery 23 is greater than that of the opening 19, although the perpendicular distance between the two flats 21 and 22 is slightly less than the diameter of the opening 19. The diameter of the periphery 23 is however less than that of the opening defined by the shoulder 16. The valve ring 20 is engaged by an arcuate surface 24 on the closure member 18, and this surface 24 leads into an annular axial projection 25 which has an outer diameter slightly greater than the inner diameter of the valve ring 20 and which extends into the opening 19. The projection 25 bounds a circular recess 26 in the upper face of the closure member 18 and the inner edge 27 of the projection 25 is chamfered. The underside of the closure member 18 has a step 28 which provides a seating for the spring 17.

On assembly, the spring 17 is inserted into the housing 1 and located with its lower end against the base 6 of the housing, and with the spring 17 compressed the closure member 18 is then inserted through the opening 19. As can be seen in FIG. 3, the dimensions of the closure member 18 are such that it will not pass through the opening when the member is substantially parallel to the plane of the opening 19, but when the member 18 is tilted the flats 21 and 22 allow the member to be inserted edge first through the opening. Once through, the member 18 is returned substantially parallel to the opening 19 and with the spring 17 and closure member 18 still depressed, the valve ring 20 is then deformed and squeezed through the opening 19. The ring 20 is located around the annular projection 25 of the closure member 18, and then on releasing the spring 17 the parts take up the positions shown in FIG. 1. The radius of the profile of the valve ring 20 corresponds to the radii of curvature of the valve seat 14 and the surface 24, and hence the ring 20 is jammed snuggly between these surfaces when the valve is closed.

Figure 2:
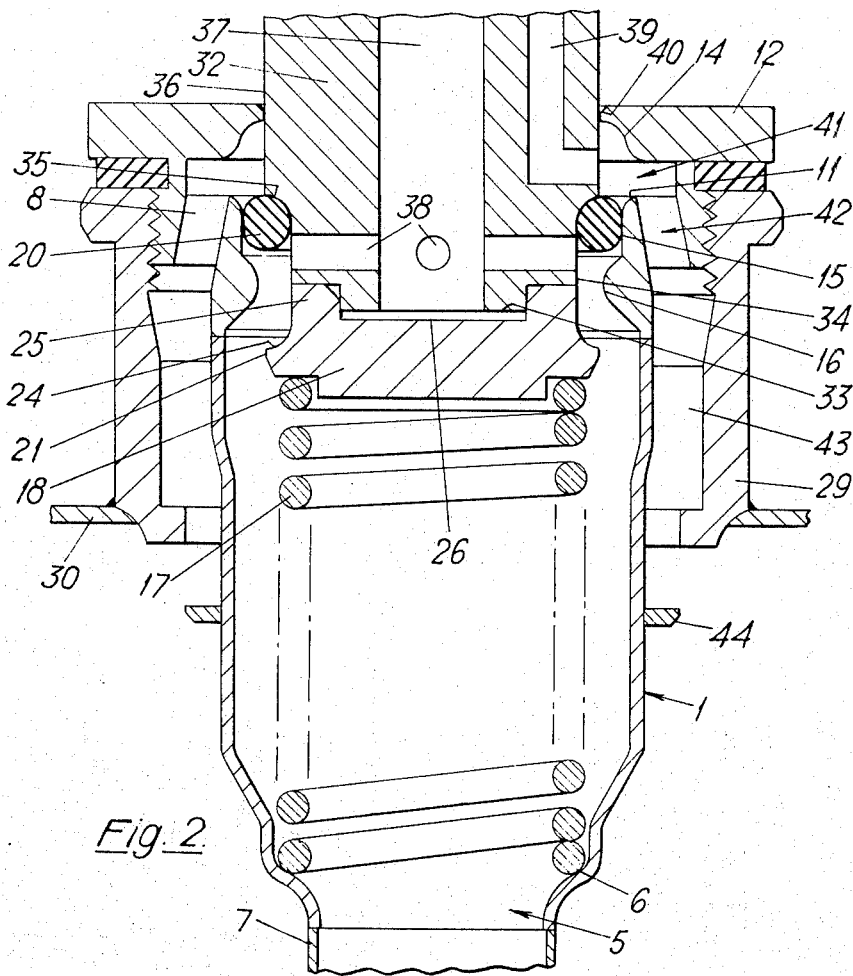
FIG. 2 is a view similar to that of FIG. 1 but showing the valve in its open position under the action of a filling or dispensing fitting; and, FIG. 3 is a plan view of the upper end of the assembly as shown in FIG. 1.

This assembly then forms a complete unit and may be fitted into a container when desired. As shown in the drawings the sleeve 9 is screwed into the internally threaded neck 29 of a keg 30, only part of which is shown, and an annular sealing ring 31 is clamped between the top end of the neck 29 and the outwardly projecting part of the flange 12. FIG. 1 shows the valve and hence the keg 30 closed, and when the keg 30 is to be filled or its contents dispensed, a special fitting is required to open the valve. As shown in FIG. 2 the fitting includes a spigot 32 having a nose 33 which fits into the recess 26 of the closure member 18 and serves to position the spigot 32 correctly in relation to the closure member 18 so that a surface 34 is continuous from the outer surface of the projection 25. The surface 34 extends through a shoulder 35 to the outer surface 36 of the spigot 32. This surface 36 has a diameter slightly less than that of the opening 19. A duct 37 through the spigot 32 communicates with a number of radial ports 38 opening into the surface 34. A further duct 39 leads through the spigot 32 and opens in the surface 36 just above the shoulder 35.

In operation the filling or dispensing fitting is advanced so that the nose 33 of the spigot 32 engages in the recess 26 of the closure member 18 and forces the member 18 inwards against the action of the spring 17 to the position shown in FIG. 2. During the travel of the closure member 18, the valve ring 20 is probably carried with the closure member until the ring engages the inner edge of the end 11 of the housing. After this the ring 20 remains stationary while the projection 25 and then the surface 34 of the spigot 32 slide through it. As this happens the shoulder 35 of the spigot 22 passes through the opening 19, being assisted by a chamfered surface 40 on the upper edge of the inner face 13 bounding the opening, and the shoulder 35 subsequently engages the valve ring 20 and carries it into the housing 1 where it seals against the second valve seating formed by the surface 15 and the shoulder 16 as shown in FIG. 2. The valve is thus open, and the ports 38 open into the housing below the valve ring 20 and hence communicate with the inside of the keg 30 through the housing 1 and the spear 7. The second duct 39 through the spigot 32 opens above the valve ring 20 and communicates with the inside of the keg 30 through a space 41 between the valve seat 14 and the upper end 11 of the housing, gaps 42 between the webs 8, and a space 43 between the housing 1 and the neck 29 of the keg 30. A further part, which is not shown, of the fitting forms a seal against the upper surface of the flange 12 around the spigot 32.

Liquid is usually dispensed from the keg when the keg is in an upright position, as shown in the drawings, and in this case gas pressure is applied to the surface of the liquid in the keg through the second duct 39, and the liquid is forced up through the spear 7 and out of the first duct 37. Filling of the keg however is usually carried out with the keg inverted, and in this case a gas pressure is applied to the keg through the duct 37 and the spear 7 while liquid is supplied through the duct 39. To prevent the liquid, particularly carbonated liquids, from foaming excessively when entering the keg, an annular flange 44 is fixed around the outside of the housing 1 to deflect the incoming liquid stream outwards towards the side of the keg.

I claim:

1. A spear and closure valve assembly for fitting to a container for potable liquid, said assembly comprising a tubular housing having a first end defining a first end opening and a second end defining a second end opening, a tubular spear extending outwardly of said housing from said second end opening, an annular first valve seat bounding a seat opening therethrough and fixed to said housing adjacent said first end opening and projecting radially inwards with respect to said first end of said housing, a second annular valve seat extending around the interior of said housing and axially spaced from said first valve seat, a resilient valve ring axially movably located between said first and second valve seats, said valve ring having a greater diameter than said seat opening and being of sufficient resilience to be deformed and inserted through said seat opening, a closure member axially movable in said housing between said valve ring and said second valve seat, a spring in said housing acting on said closure member to press said closure member against said valve ring and press said valve ring against said first valve seat, whereby said closure member and said valve ring close said seat opening, said closure member being shaped so that it will not pass through said seat opening when substantially parallel to the plane of said seat opening but is insertable into said housing through said seat opening when suitably inclined to said plane, and means defining an aperture between said first and second valve seats, said aperture communicating with the exterior of said housing, whereby when said assembly is fitted in a container, application of a filling or dispensing fitting moves said valve ring and said closure member axially inwards against the action of said spring, said closure member being displaced axially inwards from said valve ring and said valve ring sealing against said second valve seat to form two separate passages through said assembly and into said container, one of said passages extending through said housing and said spear and the other of said passages extending outside said housing via said aperture.

2. An assembly according to claim 1, wherein said second valve seat is located on the inside wall of said housing.

3. An assembly according to claim 2, wherein said inside wall of said housing has a surface adjacent said open end of said housing and an integrally formed radially inwardly projecting shoulder, said surface and said shoulder providing said second valve seat.

4. An assembly according to claim 1, wherein said closure member has an outer periphery which is basically circular, the diameter being slightly greater than the diameter of said opening bounded by said first valve seat, but which has a flat which enables said closure member to be inserted through said first valve seat opening.

5. An assembly according to claim 4, wherein there are two flats on said outer periphery of said closure member positioned diametrically opposite each other with a perpendicular distance between them which is slightly less than the diameter of said opening bounded by said first valve seat.

6. An assembly according to claim 1, wherein said first valve seat is spaced axially from said open end of said housing and said assembly includes means connecting said first valve seat to said housing comprising a sleeve surrounding said housing, a plurality of webs fixing said sleeve to the outside of said housing, and a radially inwardly projecting flange on said sleeve above said first end of said housing, said first valve seat being formed on said flange, and said aperture being formed by said spacing between said first valve seat and said first end of said housing and communicating between said webs with outside said housing.

7. An assembly according to claim 6, wherein said housing is formed in two parts, a cup-shaped lower part having edge means in its bottom defining said second end opening of said housing receiving said spear, and an upper part formed integrally with said webs, said sleeve, and said flange carrying said first valve seat.

8. An assembly according to claim 7, wherein said spear is welded to said edge means of said lower part and said lower part is welded to said upper part.

9. An assembly according to claim 1, wherein said valve ring is in the form of an O-ring, and said first valve seat is arcuate in radial section whereby said O-ring can seat upon it and is self-centering.

10. An assembly as claimed in claim 9 wherein said closure member has a concave seating surface which is arcuate in radial section whereby said valve ring seats snugly between said closure member and said first valve seat when said valve is closed.

11. An assembly according to claim 10, wherein said closure member has an axial projection which extends into said first valve seat opening when said valve is closed, the external diameter of said projection being slightly greater than the internal diameter of said valve ring.

12. An assembly according to claim 11, wherein said projection has an outer end face and a recess in said outer end face for correctly positioning said filling or dispensing fitting when this is applied to said assembly.

13. An assembly according to claim 1, including an annular radially outwardly extending flange around the outside of said housing near said second end.

* * * * *